United States Patent [19]

Takayama et al.

[11] Patent Number: 5,627,258
[45] Date of Patent: May 6, 1997

[54] BINDER FOR USE IN METAL POWDER INJECTION MOLDING AND DEBINDING METHOD BY THE USE OF THE SAME

[75] Inventors: Takemori Takayama; Masato Miyake; Yoshitaka Ohyama, all of Osaka; Katsuyoshi Saito, Kyoto; Hiroshi Ono, Saitama, all of Japan

[73] Assignee: Kabushiki Kaisha Komatsu Seisakusho, Tokyo, Japan

[21] Appl. No.: 403,199

[22] Filed: Mar. 13, 1995

[30] Foreign Application Priority Data

Mar. 14, 1994 [JP] Japan ................... 6-042643

[51] Int. Cl.$^6$ ................. C08G 73/10; C08K 5/20; C08K 5/3477
[52] U.S. Cl. ................. 528/338; 528/310; 528/322; 528/329.1; 528/339; 528/340; 528/341; 524/100; 524/227
[58] Field of Search .............. 524/100, 227, 524/600, 606, 310, 322, 329.1; 528/338, 340, 339, 341

[56] References Cited

U.S. PATENT DOCUMENTS

| | | | |
|---|---|---|---|
| 3,728,110 | 4/1973 | Klar et al. | 75/211 |
| 3,901,742 | 8/1975 | Facaros | 148/105 |
| 4,197,118 | 4/1980 | Wiech, Jr. | 75/228 |
| 4,500,665 | 2/1985 | Brecker et al. | 524/227 |
| 5,002,988 | 3/1991 | Ono et al. | 524/100 |

FOREIGN PATENT DOCUMENTS

| | | |
|---|---|---|
| 0362866A3 | 4/1990 | European Pat. Off. . |
| 0362866A2 | 4/1990 | European Pat. Off. . |
| 1198405 | 8/1989 | Japan . |
| 5033006 | 6/1993 | Japan . |

*Primary Examiner*—James J. Seidleck
*Assistant Examiner*—P. Hampton-Hightower
*Attorney, Agent, or Firm*—Armstrong, Westerman, Hattori, McLeland, & Naughton

[57] ABSTRACT

By the use of a binder comprising (a) 40 to 70 wt % of a water-soluble amide material and/or water-soluble amine material and (b) 25 to 60 wt % of a polyamide resin component substantially composed of a polyamide resin material having 10 carbon atoms or more on average between amido groups, a molded article is produced by metal powder injection molding.

From such a molded article, the water-soluble amide material and/or water-soluble amine material is eluted by a water-based solvent and then, the polyamide resin component is removed by heating.

36 Claims, 4 Drawing Sheets

FIG.4

BINDER FOR USE IN METAL POWDER INJECTION MOLDING AND DEBINDING METHOD BY THE USE OF THE SAME

BACKGROUND OF THE INVENTION (1) Field of the Invention

The present invention relates to binders for use in metal powder injection molding and debinding methods in which such binders are used. More particularly, the invention relates to improved binders which are used in metal powder injection molding in order to impart moldability to metal powder material, and further relates to debinding methods for removing the binders from the molded articles made from the metal powder material with the binders produced by injection molding.

(2) Description of the Prior Art

Generally, metal powder injection molding for producing a sintered article is composed of the steps of (i) injection molding in which a binder is added to a metal powder material for providing moldability to the material and then the mixture is formed into a molded article; (ii) debinding the molded article for removing the binder therefrom; and (iii) sintering of the debinded, molded article. Such metal powder injection molding has advantages over other methods such as metal powder press molding method in that articles having a complicated shape can be formed by a single process and less post-treatments are required. These points are not only advantageous in consideration of cost but also advantageous especially when small-size metal parts are produced.

SUMMARY OF THE INVENTION

However, metal powder injection molding presents the disadvantage that deformation, blistering and cracking of the molded articles are likely to occur particularly in the process of debinding and sintering, for the reason that a larger amount of binder is used for giving hydrostatic-pressure moldability, compared to other general powder metallurgical processes. In order to prevent such deformation, blistering and cracking, the removal of the binder has to be slowed down in the debinding step. Although the time required for the debinding step varies depending on the shape and thickness of articles to be processed, it usually takes two or three days. Deformation, blistering, cracking and the prolonged debinding step are the outstanding problems to be overcome in metal powder injection molding.

One example of binders which have been improved in view of the collapse of molded articles during the debinding step is disclosed in U.S. Pat. No. 5,002,988. According to this patent, a binder containing three kinds of binder components, i.e., three amide compounds is used and the three amide compounds are gradually gasified one after another by heating so that the binder is removed from the molded articles. Even when such a binder is used, at least two days are needed for the debinding step in order to prevent deformation, blistering and cracking. Since the polyamide resin component, which is one of the three amide compounds constituting the above binder, is an elastomeric soft component of high viscosity, it is indispensable to add 20 to 30 wt % of ethylene bis lauric acid amide to the binder as a lubricant to remarkably harden the polyamide resin component, for ensuring the mold-release characteristics of the molded articles. This imparts brittle, wax-like properties to the polyamide resin component which is associated with the strength of the binder, causing a significant coagulation/shrinkage of the molded articles in the molds at the time of cooling. As a result, there give rise to defects such as: cracking occurring inside the molded articles during the debinding step due to internal residual stress; cracking occurring from the parting lines; and cracking or chipping at the sharp edges of pin hole corners depending on the shape of the molded article. These defects could be critical to some products.

Further, ethylene bis lauric acid amide, a component indispensable for mold releasing, starts discoloration due to oxidation at a comparatively low temperature (i.e., 170° C. or more) which is just above its melting point (155° to 160° C.). Therefore, special attentions should be given, bearing thermal stability in mind, to the temperature at which the binder is mixed with a metal powder material, injection molding temperature, other injection molding conditions (e.g., injection pressure, holding pressure, injection speed, gate size) and the mixing ratio of the binder to a metal powder material, in order to prevent deterioration of binder characteristics. Another disadvantage is that since the decomposed components exert considerably high water absorbency, the hydrolysis of the binder gradually takes place, resulting in a failure in the formation of molded articles.

Apart from the problems related to manufacturing management, the above binder imposes other problems. For example, when the binder is mixed with a fine, active metal powder material having a size of 5 µm or less such as carbonyl iron powder, the thermal decomposition of ethylene bis lauric acid amide added in an amount of 20 to 30 wt % is accelerated by the carbonyl iron powder working as a catalyst. This leads to the following problems:

(1) When the binder containing a large amount of ethylene bis lauric acid amide is mixed with carbonyl iron powder, special care should be taken for controlling the mixing ratio of the binder to the carbonyl iron powder and for controlling mixing temperature etc. in order to prevent the generation of excessive shearing stress, since molded articles cannot be produced under some conditions.

(2) When the molded articles are vacuum sintered in an atmosphere of $N_2$ gas at 1,200° C. after being debinded, the concentration of carbon which has been left from the binder in the sintered bodies varies depending on final debinding temperature. As a result, the carbon content not only varies within a sintered body, but also varies for every sintered body and every lot. In a critical case, this could be the cause of melting-down of articles during sintering. To avoid such an undesirable situation, it is necessary to reduce the amount of ethylene bis lauric acid amide to be added to the utmost, or to use other thermally and chemically stable materials in place of ethylene bis lauric acid amide.

In this binder, $C_{36}$-dimeric acid is used as a dimer acid which is the major component of the polyamide resin component, i.e., one of the aforesaid three amide compounds. The main chemical structure of $C_{36}$-dimeric acid is a ring system and therefore when the acid meets with moisture in air, the moisture is easily entrapped between the molecules of $C_{36}$-dimeric acid so that hydrolysis gradually takes place, resulting in a failure in the production of molded articles.

Therefore, when a mixture of a metal powder material and such a binder is used in injection molding or when sprues, runners and the like which are inevitably produced in injection molding is reused, moisture taken from air should be carefully controlled and the characteristics of the returned mixture should be controlled after injection molding. This could be a great disadvantage for recycling of natural resources.

Since ethylene bis lauric acid amide, which causes considerable binder strength degradation, is added in an amount of 20 to 30 wt %, it is necessary to increase the amount of polyamide resin component to be added, for increasing the strength of the molded articles. This limits the amount of N, N'-diacetyl piperazine to be used, which is the third amide compound and has the effects of saving debinding time and preventing deformation of the molded articles during the debinding step. In consequence, it becomes difficult to reduce the time required for debinding.

One of the important factors which determines whether satisfactory metal powder injection molding can be achieved is "the selection of a superior binder". Such a superior binder provides, for example, a large amount of N, N'-diacetyl piperazine while considerably reducing the amount of ethylene bis lauric acid amide to be added so that toughness which is one of the features inherent to plastics can be enhanced by reducing the water absorbency and hydrolyzing characteristics of the polyamide resin component.

Japanese Pat. Publication Laid Open No. 62-297257 (1987) discloses a method in which alumina ceramics are produced using a technique similar to metal powder injection molding. Iron alloys used as a metal powder material in metal powder injection molding have a true specific gravity of 7 to 8 which is about two times that of the material of alumina ceramics. Therefore, the true specific gravity of the molded articles obtained by injection molding of the metal powder material is about two times that of alumina ceramics. This means that molded articles produced by metal powder injection molding are liable to damage in the course of injection molding or handling after injection molding. Further, there is a likelihood that those molded articles are deformed during the debinding step. Accordingly, it depends on "the selection of a superior binder" whether molded articles of high quality can be achieved.

One example of binders for use in metal powder injection molding is disclosed in Japanese Pat. Publication No. 61-48563 (1986). The binder disclosed in this publication contains binder components having different melting points. These binder components are heated so that they gradually flow out of the molded articles one after another in the form of liquid, and then, the liquids are absorbed by an absorbent material to remove the binder from the molded articles, whereby the molded articles are debinded. However, this binder presents the disadvantage that since the binder is liquefied when it is removed from the molded articles, the molded articles are likely to be unable to hold their own weight and consequently collapse during the debinding step, especially in cases where a metal powder material of high specific gravity is used.

U.S. Pat. No. 4,197,118 discloses another binder which has been made to overcome the deformation of molded articles in the debinding step. According to this publication, binder components (liquid oils) are eluted from the molded articles at room temperature by the use of an organic solvent such as methylene chloride, thereby debinding the molded articles. This binder also suffers from the disadvantage that since the binder is composed of liquid oil binder components, the shape-retention of the molded articles in injection molding is very poor so that the molded articles are easily broken when removed from the molds after completion of injection molding. Furthermore, organic solvents such as methylene chloride are not friendly to the environment of workers. Therefore, there are strong demands for a much safer solvent extraction debinding method.

The present invention has been made taking the foregoing problems into account and the prime object of the invention is therefore to provide a binder for use in metal powder injection molding which is capable of reducing the time required for debinding and eliminating the need for taking special care for rapid decomposition vaporization and expansion caused by heat, and to provide a debinding method in which such a binder is used.

Another object of the invention is to provide a binder for use in metal powder injection molding which is capable of ensuring the shape-retention of molded articles during the debinding step and greatly shortening the time required for debinding, and to provide a debinding method by the use of such a binder.

A further object of the invention is to provide a binder for use in metal powder injection molding which is stable against moisture, and to provide a debinding method utilizing water-solvent extraction in which water, a safe substance for a human body, is used as a solvent.

A still further object of the invention is to provide a binder for use in metal powder injection molding which is capable of producing molded articles excellent in strength and toughness to be freed from defects caused during the injection molding and debinding steps, and to provide a debinding method by the use of such a binder.

In order to accomplish the foregoing objects, a binder for use in metal powder injection molding according to the invention comprises:

(a) 40 to 70 wt % of a water-soluble amide material and/or water-soluble amine material and (b) 25 to 60 wt % of a polyamide resin component containing (i) a polyamide resin material having 8 carbon atoms or more on average between amido groups and (ii) an aromatic bisamide serving as a compatibilizer and having 8 carbon atoms or more on average between amido groups, the amount of the aromatic bisamide mixed with the polyamide resin material being up to an amount substantially equal to the amount of the polyamide resin material.

By the use of the compatibilizer mixed in the polyamide resin component, the melting point of the polyamide resin component is controlled (lowered), the swelling property decreases, and the mold-release characteristics of the molded articles increases. This eliminates the need for a large quantity of lubricant which is used in the prior art binders, thus preventing a decrease in the strength of the molded articles caused by adding a lubricant. Aromatic bisamide used as such a compatibilizer has a relatively low melting point and high resistance to thermal decomposition.

In the case where the number of carbon atoms present between the amido groups of the polyamide resin material is 10 or more on average, the polyamide resin material exhibits, by itself, mold-release characteristics, low swelling property and heat resistance. Therefore, in this case, there is no need to use a compatibilizer and the foregoing objects can be achieved by a binder for use in metal powder injection molding according to the invention comprising:

(a) 40 to 70 wt % of a water-soluble amide material and/or water-soluble amine material and (b) 25 to 60 wt % of a polyamide resin component substantially composed of a polyamide resin material having 10 carbon atoms or more on average between amido groups.

If desired, 0 to 15 wt % of a lubricant may be further contained in the binder of the invention to improve the mold-release characteristics of the molded articles.

The water-soluble amide material has amido groups. Materials which can be used as the water-soluble amide material are classified into two groups according to whether they contain a benzene ring or not in their chemical structure. Examples of the materials containing no benzene ring include acetamide, propionic amide, alloxan (monohydrate), ethylurethane, ethyleneurea, glycolamide, heptanamide, methylacetamide, methylacetylurea, methyluracil trimethylurea, and ethyl carbamate. Examples of the materials containing a benzene ring include nitrobenzamide (o), nitrobenzhydrazide (o), phenylsemicarbazide (1) ($C_6 H_5 NHCO_2 C_6 H_5$), phenyl carbamate ($C_7 H_7 C_6 H_4 O_2 CNH_2$), toluyl amide (o), toluyl amide (p), acetaminophenol, acetonaphthyl amide and aminobenzamide (o). The water-soluble amide material is one member selected from the groups of materials having a benzene ring and having no benzene ring. Alternatively, it may be a mixture of two or more members selected from these groups.

The water-soluble amine material has amino groups. Materials which can be used as the water-soluble amine material are also classified into two groups, primary amines and secondary amines. A representative example of the water-soluble amine material is N, N'-diacetylpiperazine (secondary amine)which is prepared, for example, by dehydro-copolymerization of about one mol of hexahydropiperazine and about 2 mols of acetic acid by an ordinary method. Examples of the primary amines used as the water-soluble amine material are aminodimethylaniline (p), aminopyridine (3) ($\beta$), aminoquinoline (2) ($\alpha$) ($NH_2 C_9 H_8 N$), aminoquinoline (3) ($\beta$), diaminohydrazobenzene (p) (($H_2 NC_6 H_4 NH)_2$), hexamethylenediamine, histamine, menthylamine (1), naphthylamine ($\beta$), nitro-p-aminophenol (3), nitroaniline (o), nitrophenylhydrazine (p), nitrosoaniline (p), phenylaniline (p), phenylethylamine ($\beta$), phenylene diamine (m), toluylene diamine, toluylene diamine (1;2,4), toluylene diamine (1;2,5), triaminobenzene (1,2,3), triaminobenzene (1,2,4), and triethylenetetramine. Examples of the secondary amines used as the water-soluble amine material are acetyl-p-phenylenediamine, aminopyridine (2) ($\alpha$), diformylhydrazine (($NHCHO)_2$), dipyridyl (4,4'), dipyridyl (3,3'), formylphenylhydrazine ($\beta$) ($C_6 H_5 NHNHCHO$), glucose phenylhydrazone ($C_6 H_5 NHN=C_6H_{12}O_5$), hydroxyethyl-ethylenediamine ($HOCH_2 CH_2 NHCH_2 CH_2 NH_2$), hydroxypyridine, methylamino-p-hydroxybenzoic acid (3), methylbenzimidazole (2), methylglyoxalidine methylindole (2), nitrophenylhydrazine (p), phenylglycine (N)and triazole. The water-soluble amine material is one member selected from the above primary amines and secondary amines, or alternatively, a mixture of two or more members selected from these groups. It is also possible to use the water-soluble amide materials and water-soluble amine materials in combination.

The water-soluble amide material and water-soluble amine material are respectively compatible with the polyamide resin component which constitutes the binder since these materials have amido groups and amino groups respectively. These water-soluble materials preferably have a melting point of 190° C. or less and a boiling point of 175° C. or more. If their melting point exceeds 190° C., the fluidity of the binder tends to be impaired and as a result, injection molding characteristics are also impaired. If their boiling point falls below 175° C., the water-soluble materials tend to evaporate from the binder during the time when the binder is being mixed with a metal powder material or when injection molding is being carried out. This impairs the stability of the injection molding and makes it difficult to reuse the returned material. It is enough if 1 gram of these water-soluble materials is dissolved in 100 cc of water. If 10 grams or more are dissolved, high extractability can be achieved.

Although a $C_{44}$-dimeric acid having a linear chain system as a major component and $C_{44}$-dimeric acid having a ring system as a major component are both possibly used as the polyamide resin material, a $C_{44}$-dimeric acid having a ring system is not desired since it has a problem in water absorption as explained in the description of $C_{36}$-dimeric acid having a ring system. For this reason, a $C_{44}$-dimeric acid having a linear chain system is preferably used in the invention. Representative of such a $C_{44}$-dimeric acid are polymerized fatty acids obtained from bimolecular polymerization of unsaturated fatty acids. For example, the compound described by the following chemical formula may be used.

This $C_{44}$-dimeric acid is commercially available. One example of the $C_{44}$-dimeric acid is "PRIPOL 1004" produced by Unichema International (Netherlands). PRIPOL 1004 is made from rapeseed oil and contains about 90 mol % of $C_{44}$-dimeric acid having a linear chain system. As the $C_{44}$-dimeric acid, grape seed oil or mustard seed oil may be used. Basically, $C_{36}$-dimeric acid having a linear chain system may be treated substantially identical with $C_{44}$-dimeric acid. Concretely, "PRIPOL 1013" and "PRIPOL 1008" produced by Unichema International may be used by mixing with the $C_{44}$-dimeric acid. "PRIPOL 1013" contains about 23 mol % of a linear chain component, while "PRIPOL 1008" contains about 37 mol % of a linear chain component.

As the polyamide resin material, aliphatic dicarboxylic acids having 6 to 10 carbon atoms may be used. Examples of the aliphatic dicarboxylic acids that can be used are adipic acid ($C_6$-dimeric acid), azelaic acid ($C_7$-dimeric acid), phthalic acid ($C_8$-dimeric acid; phthalic acid having a six-membered ring system is included) and sebacic acid ($C_{10}$-dimeric acid). These acids are also commercially available. One or a mixture of two or more selected from these aliphatic dicarboxylic acids may be used as the polyamide resin material.

In the invention, the polyamide resin material can be obtained in the following way: the $C_{44}$-dimeric acid etc. is mixed with ethylenediamine and/or hexamethylenediamine in a molecular weight ratio ranging from 7:3 to 3:7. This mixture is added to the aliphatic dicarboxylic acid and xylylenediamine and then, the product is subjected to dehydro-copolycondensation. The polyamide resin material thus obtained is in a substantially irregular structure and exhibits excellent elasticity and low water absorbency. Preferably, such a material has an average molecular weight of 20,000 or more. Xylylenediamine has a benzene ring in its chemical structure and is thought to be a component which contributes to the low water absorbency and high thermal decomposition resistance of the polyamide resin material. The function of the $C_{44}$-dimeric acid and $C_{36}$-dimeric acid is to remarkably increase the average number of carbon atoms present between amido groups. They are particularly useful in decreasing the melting point and water absorbency of the polyamide resin material, so that the material has much less water absorbency than nylon 6, 6. The compounding ratio of the polyamide resin component is so determined that the average number of carbon atoms between amido groups is 8 or more. Even if the polyamide resin material has an average molecular weight of 50,000 or not less than 100,000, it does not significantly affect the invention.

In the binder for metal powder injection molding of the invention, the polyamide resin component may comprise:

(i) a polyamide resin material having 8 carbon atoms or more on average between amido groups and prepared by co-polycondensation of (1) a $C_{36}$-dimeric acid, $C_{44}$-dimeric acid or a mixture of the $C_{36}$-dimeric acid and $C_{44}$-dimeric acid; (2) an aliphatic dicarboxylic acid having 6 to 10 carbon atoms; (3) xylylenediamine; and (4) ethylenediamine and/or hexamethylenediamine and;

(ii) an aromatic bisamide having 8 carbon atoms or more on average between amido groups and serving as a compatibilizer, the amount of the aromatic bisamide mixed with the polyamide resin material being up to an amount substantially equal to the amount of the polyamide resin material.

In the case where the number of carbon atoms present between amido groups of the polyamide resin material is 10 or more on average, there is no need to use a compatibilizer.

Hence, the polyamide resin component may be substantially composed of a polyamide resin material having 10 carbon atoms or more on average between amido groups and prepared by copolycondensation of (1) a $C_{36}$-dimeric acid, $C_{44}$-dimeric acid or a mixture of the $C_{36}$-dimeric acid and $C_{44}$-dimeric acid; (2) an aliphatic dicarboxylic acid having 6 to 10 carbon atoms; (3) xylylenediamine; and (4) ethylenediamine and/or hexamethylenediamine.

Preferably, the polyamide resin material has an average molecular weight of 20,000 or more.

In view of the water absorbency and hydrolyzing characteristics of the polyamide resin component and the function or the binder in the mold-release characteristics of the molded articles, it is assumed that the $C_{36}$-dimeric acid and $C_{44}$-dimeric acid (dimer acid) contained in the polyamide resin component make it difficult to remove finished articles from the molds. Although the invention uses a lubricant to overcome this disadvantage, it is desirable to limit the amount of lubricant to be added as small as possible. Therefore, either of nylon 11 and nylon 12 which have less water absorbency than nylon 6 or the like is used as the base material of the polyamide resin material. This enhances the compatibility of the aromatic bisamide and enables it to control the melting point of the binder. In addition, the use of nylon 11 or nylon 12 considerably decreases the water absorbency of the binder and improves its alcohol resistance. Further, this enables debinding in which solvent extraction by the use of water and/or a water/alcohol solvent is employed.

Hence, the polyamide resin component in the binder for metal powder injection molding according to the invention may comprise:

(i) a polyamide resin material having 8 carbon atoms on average between amido groups and containing for example a nylon 11 and nylon 12 as a major component and; (ii) an aromatic bisamide serving as a compatibilizer and having 8 carbon atoms on average between amido groups, the amount of the aromatic bisamide mixed with the polyamide resin material being up to an amount substantially equal to the amount of the polyamide resin material.

As mentioned earlier, when the number of carbon atoms present between amido groups is 10 or more on average, a compatibilizer is not necessary. Therefore, the polyamide resin component may be substantially composed of a polyamide resin material having 10 carbon atoms on average between amido groups and containing, for example, a nylon 11 and nylon 12 as a major component.

The average molecular weight of the polyamide resin material is preferably 13,000 or more. The preferable melting point or glass-transition temperature of the polyamide resin material is approximately 190° C. or less.

Such a nylon 11 and nylon 12 may be prepared, for example, by dehydro-condensation of ω-aminoundecanoic acid and ω-aminolauric acid. In the polyamide resin material having 8 carbon atoms or more on average between amido groups and containing nylon 11 and nylon 12 as a major material, the nylon 11 and nylon 12 may be copolymerized with other nylons such as nylon 2, 36, nylon 2, 44, nylon 6, nylon 6, 8, nylon 6, 10, nylon 6, 36, nylon 6, 44 and ether, etc.

There are commercially-available materials which can be used as the materials constituting the polyamide resin component. Examples of the nylon 12 are "Daiamid A1709P" and "Daiamid L1724K" produced by Daicel-Huels Ltd. An example of the nylon 12-ether copolymer is "Daiamid E40S3" produced by Daicel-Huels Ltd.

Examples of the compatibilizer, which is used for the purpose of improving the water resistance and reducing the hydrolyzing characteristics of the polyamide resin component as well as for the purpose of controlling the melting point and preventing the decrease of strength caused by the addition of a lubricant, are m-xylylene bis stearic acid amide, N, N'-distearyl isophthalic acid amide, and N, N'-distearyl terephthalic acid amide. These acid amides are aromatic bisamide having a benzene ring (6 membered ring) system, low melting point and excellent thermal stability. One member or a mixture of two or more members selected from the above acid amides are used as the compatibilizer and the compatibility of the polyamide resin material which is the base material of the polyamide resin component is enhanced by such a compatibilizer. In addition, the water absorbency of the polyamide resin material is reduced and time average number of carbon atoms present between amido groups in the chemical structure of the polyamide resin material is made equal to the average number of carbon atoms present between amido groups in the compatibilizer or more (i.e., 8 or more). Thus, the polyamide resin material is improved in its chemical structure, which leads to the improvement of the features of the polyamide resin material, these features being associated with the plastic toughness and mold-release characteristics of the molded articles. This improvement eliminates the necessity for the use of ethylene bis lauric acid amide or significantly decreases its amount, so that the binder can be prevented from having brittle and wax-like properties. The compatibilizers may be added in the manner mentioned earlier (i.e., mixing) or by co-polycondensation which takes place simultaneously with the co-polycondensation of the polyamide resin material. By mutual dissolving of xylylene bis stearic acid amid having a benzene ring (6 membered ring) system and N, N'-distearyl isophthalic acid component, the problem in the water absorbency of the $C_{36}$-dimeric acid and $C_{44}$-dimeric acid having a ring system can be substantially solved. As mentioned above, the addition of a lubricant such as ethylene bis lauric acid amide which causes an increase in the wax-like properties of the binder can be reduced, thereby reducing the deterioration of strength and improving thermal stability.

This permits the addition of a large amount of the water-soluble amide material and/or water-soluble amine material. Note that xylylene bis stearic acid amide is commercially available and PXS produced by Nippon Kasei Chemical Co., Ltd., for example, can be employed in the invention.

As the lubricant contained in the binder of the invention, all the lubricants generally used in metal powder injection molding can be used. Examples of such lubricants are fatty acids and the derivatives of fatty acids such as esters, amides and metallic salts. Of these fatty acids and derivatives, fatty acid amides and N-substitution fatty acid amides which have amido groups in a linear chain system are particularly preferable, in view of binder strength attributable to the separability and partial compatibility of the lubricant in relation to other components. Substitution ureas are also preferable as the lubricant.

Examples of the fatty acid amides that can be used as the lubricant are lauric acid amide, stearic acid amide, oleic acid amide, erucic acid amide, ricinoleic acid amide, 12-hydroxystearic acid amide and specific fatty acid amides.

The N-substitution fatty acid amides that can be used as the lubricant are classified into two categories, saturated and unsaturated. Examples of the saturated fatty acid amides are N, N'-ethylene bis lauric acid amide, N, N'-methylene bis stearic acid amide, N, N'-ethylene bis stearic acid amide, N, N'-ethylene bis oleic acid amide, N, N'-ethylene bis bellenic acid amide, N, N'-ethylene bis-12-hydroxystearic acid amide, N, N'-buthylene bis stearic acid amide, N, N'-hexamethylene bis stearic acid amide, N, N'-hexamethylene bis oleic acid amide, and N, N'-xylylene bis stearic acid amide. Examples of the unsaturated fatty acid amides are N-oleyl stearic acid amide, N-oleyl oleic acid amide, N-stearyl stearic acid amide, N-stearyl oleic acid amide, N-oleyl palmitic acid amide, N-stearyl erucic acid amide, N, N'-dioleyl adipic acid amide, N, N'-distearyl adipic acid amide, N, N'-dioleyl sebacic acid amide, N, N'-distearyl sebacic acid amide, N, N'-distearyl terephthalic acid amide, and N, N'-distearyl isophthalic acid amide.

Although N, N'-ethylene bis lauric acid amide and N, N'-ethylene bis stearic acid amide are obtained by dehydrocondensation of ethylene diamine and lauric acid, and by dehydrocondensation of ethylene diamine and stearic acid respectively (these acids are saturated aliphatic monocarboxylic acids), most of the above saturated and unsaturated fatty acid amides and N-substitution fatty acid amides are commercially available. For example, Slipacks E produced by Nippon Kasei Chemical Co., Ltd. can be used as the N, N'-ethylene bis stearic acid amide.

Representative examples of the substitution ureas that can be used in the invention are N-butyl-N' stearylurea, N-phenyl-N' stearylurea, N-stearyl-N' stearylurea, xylylene bis stearylurea, toluylene bis stearylurea, hexamethylene bis stearylurea, diphenylmethane bis stearylurea, and diphenylmethane bis laurilurea.

In the invention, the water-soluble amide material and water-soluble amine material gradually gasify due to thermal decomposition at the initial stage of the debinding step, thereby forming escaping paths so that other binder components can easily escape as well. This ensures the shape retention of the molded articles during the debinding step. Therefore, not only can satisfactory debinding free from problems such as blistering be achieved, but also the time required for the debinding step can be considerably reduced. (However, such gasified components are also liquefied before gasification. Therefore, there usually are limits to which heating speed for debinding can be increased in order to perfectly prevent deformation at the time of debinding. For advancing the limits as much as possible, it is indispensable to use a larger amount of gasified components.)

When the water-soluble amide material and water-soluble amine material are extracted by water, water solvent debinding plays a significant part in the debinding step since the water-soluble amide and amine materials are contained in a large amount, that is, 40 to 70 wt %. This reduces the percentage of the time consuming process, i.e., thermal debinding and as a result, the time required for the debinding step can be reduced. In addition, since the amount of components to be thermally debinded is small, special care for preventing abrupt decomposition gasification and expansion caused by the heat of the binder is no longer necessary. The amount of the water-soluble amide material and water-soluble amine material to be used is within the range of 40 to 70 wt %, based on the amount of the binder. If it falls below 40 wt %, it takes much time to satisfactorily perform thermal decomposition debinding or water-solvent extraction debinding in terms of shape retention. If it exceeds 70 wt %, it becomes difficult to take the molded articles out of the molds because of the deterioration of strength. The preferable amount of these materials is in the range of 45 to 60 wt %.

Since the polyamide resin material contains $C_{44}$-dimeric acid, the binder of the invention has toughness superior to that of a binder containing $C_{36}$-dimeric acid, due to macromolecularization effects. As mentioned earlier, this enables it to relatively increase the weight ratio of the water-soluble amide material and water-soluble amine material upon which the length of debinding time is dependent, so that debinding time can be shortened. By dissolving an aromatic bisamide such as xylylene bis stearic acid amide, N, N'-distearyl terephthalic acid amide or N, N'-distearyl isophthalic acid amide mutually with the polyamide resin material, partial crystallization of the polyamide resin component is caused thereby improving mold-release characteristics and decreasing water absorbency. As a result, the amount of lubricant that causes significant strength deterioration can be considerably reduced, so that macromolecularization effects lacking in $C_{36}$-dimeric acid can be achieved. This also leads to the considerable reduction of debinding time for the same reason as explained earlier.

The amount of moisture entrapped by the binder can be reduced by the combination of improvements described below.

(1) The restriction of the density of the amide bond, the increased average number of carbon atoms present between amido groups (hereinafter referred to as "average carbon number"), and more macromolecularization effects can be achieved by the use of the $C_{44}$-dimeric acid having a linear chain system as a major component. This contributes to the reduction of the amount of moisture entrapped by the polyamide resin component.

(2) Water absorbency can be decreased by mutual dissolving of the aromatic bisamide.

(3) The water absorbency of the thermally decomposed components can be decreased by the significant reduction of the amount of the thermally unstable lubricant to be added.

(4) As a lubricant, ethylene bis stearic acid amide or the like is used, which is more effective in enhancing mold-release characteristics and has more carbon atoms and higher thermal stability than ethylene bis lauric acid amide.

The reduced moisture amount prevents troubles such as the decrease of inter-molecular affinity and the significant deterioration of pressure-molding characteristics caused by hydrolysis. As a result, special care for preventing the binder from entrapping moisture is no longer needed. In addition, it is possible to ensure recycling of the binder, a mixture of the binder and a metal powder material, sprues and runners that are inevitably produced in injection molding.

The polyamide resin component of the invention is used in an amount of 25 wt % or more based on the amount of the binder in order to carry a relatively heavy metal powder material in the injection-molded articles. If the amount is less than 25 wt %, breakage is likely to occur when the molded articles are removed from the molds and handled after injection molding. The preferable amount of the polyamide resin component to be used is not more than 60 wt % based on the amount of the binder. Although the aromatic bisamide may be contained as a compatibilizer in the polyamide resin component in an amount of up to 70 wt %, the aromatic bisamide is preferably used in an amount less than the amount of the polyamide resin material. This is because when the amount of the aromatic bisamide is substantially equal to that of the polyamide resin material, the polyamide resin component starts hardening, increasing the possibility of breakage.

The amount of the lubricant to be used is in the range of 0 to 15 wt %, and preferably about 10 wt % based on the amount of the binder, for the reason that if it is 15 wt % or more, the binder becomes wax-like to a considerable extent since the lubricant has the function of increasing the mold-release characteristics of the molded articles when the articles are removed from the molds. When the aromatic bisamide is added as a compatibilizer in an amount of 15 wt % or more based on the amount of the binder, the binder can function perfectly in metal powder injection molding without the lubricant.

As the lubricant, ethylene bis lauric acid amide may be used. Although ethylene bis lauric acid amide has a problem in its thermal real stability as mentioned earlier, if the amount of this acid amide is 15 wt % or less based on the amount of the binder, the concentration of residual carbons in the sintered body, which is obtained by debinding a molded article made from a carbonyl iron powder material in an atmosphere of $N_2$ gas, can be kept substantially stable so that the sintered body is free from quality problems. Needless to say, as the thermal stability of the lubricant to be used increases, the residual carbon concentration becomes more stable. Therefore, bisamides having more carbon atoms (e.g., N-substitution bisamide compounds) are more reliable than ethylene bis lauric acid amide.

The binder of the invention has the advantages that it has minimized amount of lubricant to be used or no lubricant such as ethylene bis lauric acid amide that causes the deterioration of strength and that it is of a tough plastic type. With these advantages, troubles such as the generation of internal cracks considered to be due to residual stress during injection molding and chipping of the corner of a hole can be overcome so that the quality inspection for finished articles can be considerably shortened.

The water-soluble amide material, water-soluble amine material, polyamide resin material, compatibilizer and lubricant may be melted by heat, mixed and used in the form of a sheet, pellet or powder. The binder thus prepared is usually mixed with a metal powder material and used as a molding material. Alternatively, the water-soluble amide material and/or water-soluble amine material, polyamide resin material, compatibilizer and lubricant are directly mixed with a metal powder material and used as a molding material.

Although the mixing ratio of the binder to a metal powder material varies according to the type, particle size and particle shape of a metal powder material to be used, the binder is usually used in an amount of 5 to 15 parts by weight per 100 parts by weight of a metal powder material.

In the metal powder injection molding mentioned herein, any known injection molding method may be employed.

The objects of the invention are achieved by a debinding method by the use of a binder for metal powder injection molding which comprises (a) 40 to 70 wt % of a water-soluble amide material and/or water-soluble amine material and (b) 25 to 60 wt % of a polyamide resin component containing (i) a polyamide resin material having 8 carbon atoms or more on average between amido groups and (ii) an aromatic bisamide serving as a compatibilizer and having 8 carbon atoms or more on average between amido groups, the amount of the aromatic bisamide mixed with the polyamide resin material being up to an amount substantially equal to the amount of the polyamide resin material,
the method comprising the steps of:

(1) eluting the water-soluble amide material and/or water-soluble soluble amine material from a molded body prepared by injection molding with said binder, using a water-based solvent; and (2) removing the polyamide resin component and a lubricant from the molded body by heating.

When the average number of carbon atoms present between amido groups in the polyamide resin material is 10 or more, there is no need to use the compatibilizer, so that the objects of the invention are achieved by a debinding method by the use of a binder for metal powder injection molding which comprises (a) 40 to 70 wt % of a water-soluble amide material and/or water-soluble amine material and (b) 25 to 60 wt % of a polyamide resin component substantially composed of a polyamide resin material having 10 carbon atoms or more on average between amido groups, the method comprising the steps of:

(1) eluting the water-soluble amide material and/or water-soluble amine material from a molded body prepared by injection molding with said binder, using a water-based solvent; and (2) removing the polyamide resin component from the molded body by heating.

The water-soluble amide material and/or water soluble amine material and polyamide resin component have been already set forth above. The binder for metal powder injection molding may contain a lubricant as mentioned earlier. The solvent containing water as a base component (water-based solvent) is not only water but also a mixture of water and an organic solvent such as alcohol. Mixing of alcohol or the like increases extraction efficiency.

In cases where the debinding method of the invention utilizes water-solvent extraction, there is no need to take into account abrupt decomposition-gasification and expansion caused by heat. As the water-soluble amide material and/or water-soluble amine material, one of the above-listed materials or alternatively a mixture of two or more selected from the above materials may be used, and in these cases, the same effects can be achieved. Although a liquid material such as dimethylformamide or dimethylacetamide is possibly used, such a material causes strength deterioration and therefore the shape of articles to which the invention can be applied is limited. The debinding method utilizing water-solvent extraction enables further reduction of debinding time. Further, this method is applicable to cases where the conventional thermal-decomposition debinding method cannot be suitably used, for example, when producing (i) articles having particular shapes liable to deformation in the process of debinding; (ii) articles formed from a metal powder material which is likely to cause internal defects in the process of heating in thermal-decomposition debinding; (iii) articles formed from a metal powder material having high specific gravity such as tungsten; and (iv) large-size articles.

The invention is also related to molded articles obtained by injection-molding of metal powder materials by the use of the binders of the invention. The invention is further directed to debinded bodies obtained by the debinding method of the invention, and to sintered bodies obtained by sintering after being debinded by the debinding method of the invention.

Other objects of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and accompanying drawings which are given by way of illustration only, and thus are not limitative of the present invention, and wherein:

FIGS. 1 to 4 are related to an experiment conducted for explaining examples of the invention and their comparative examples;

DESCRIPTION OF THE PREFERRED EMBODIMENTS

Examples of binders for use in metal powder injection molding according to the invention and debinding methods using such binders will be hereinafter described in detail by contrast with their comparative examples.

(A) Binder composition 13 mols of $C_{44}$-dimeric acid ("PRIPOL 1004" produced by Unichema International), 7 mols of azelaic acid ($C_7$-dimeric acid), 7 mols of ethylenediamine and 13 mols of xylylenediamine were mixed and dehydro-copolycondensated, thereby obtaining a polyamide resin component (1) having an average molecular weight of about 50,000. The polyamide resin component (1) has about 17.5 carbon atoms on average between amido groups in its chemical structure.

13 mols of $C_{36}$-dimeric acid ("PRIPOL 1004" produced by Unichema International, linear chain component: 37 mol %), 7 mols of azelaic acid, 7 mols of ethylenediamine and 13 mols of xylylenediamine were mixed and dehydro-copolycondensated, thereby obtaining a polyamide resin component (2) having an average molecular weight of about 40,000. The polyamide resin component (2) has about 14.9 carbon atoms on average between amido groups.

10 mols of a dimer acid prepared by mixing $C_{36}$-dimeric acid ("PRIPOL 1008" produced by Unichema International) with $C_{44}$-dimeric acid ("PRIPOL 1004") at a weight ratio of 7:3, 10 mols of azelaic acid, 10 mols of ethylenediamine and 10 mols of xylylenediamine were mixed and dehydro-copolycondensated, thereby obtaining a polyamide resin component (3) having an average molecular weight of about 40,000. The polyamide resin component (3) has about 12.9 carbon atoms on average between amido groups.

1 mol of piperazine and 2 mols of acetic acid were mixed and dehydro-copolycondensated, thereby obtaining N, N'-diacetylpiperazine. As N, N'-ethylene his lauric acid amide, a commercial product, "Slipacks L" produced by Nippon Kasei Chemical Co., Ltd. (melting point: 156° to 160° C.) was used. Commercial products, "Slipacks E" produced by Nippon Kasei Chemical Co., Ltd. (melting point: 142° to 146° C.) and "Slipacks PXS" produced by Nippon Kasei Chemical Co., Ltd. (melting point: about 123° C.) were used as N, N'-ethylene his stearic acid amide and N, N'-xylylene bis stearic acid amide, respectively.

The polyamide resin components (1), (2), (3) thus prepared and N, N'- ethylene bis lauric acid amide, N, N'-ethylene bis stearic acid amide, N, N'- xylylene bis stearic acid amide, and N, N'-diacetylpiperazine were melted and mixed at the weight ratios shown in Tables 1 and 2. The mixtures were pulverized after cooling so that Binders A to L, S and U were obtained.

TABLE 1

| | POLYAMIDE RESIN COMPONENT (1) | POLYAMIDE RESIN COMPONENT (2) | POLYAMIDE RESIN COMPONENT (3) | XYLYLENE BIS STEARIC ACID AMIDE | ETHYLENE BIS LAURIC ACID AMIDE | ETHYLENE BIS STEARIC ACID AMIDE | N,N'-DIACETYL-PIPERAZINE |
|---|---|---|---|---|---|---|---|
| A | 25 | | | | 5 | | 70 |
| B | 23 | | | 5 | | 2 | 70 |
| C | 30 | | | | 10 | | 60 |
| D | 35 | | | | 15 | | 50 |
| E | | 30 | | 10 | | 5 | 55 |
| F | 40 | | | | 20 | | 40 |
| G | 15 | 35 | | | 5 | 5 | 40 |
| H | | 25 | | 10 | | 5 | 60 |
| I | 40 | | | | 5 | 5 | 50 |

TABLE 1-continued

| | POLYAMIDE RESIN COMPONENT (1) | POLYAMIDE RESIN COMPONENT (2) | POLYAMIDE RESIN COMPONENT (3) | XYLYLENE BIS STEARIC ACID AMIDE | ETHYLENE BIS LAURIC ACID AMIDE | ETHYLENE BIS STEARIC ACID AMIDE | N,N'-DIACETYL-PIPERAZINE |
|---|---|---|---|---|---|---|---|
| J | | 30 | | 15 | | | 55 |
| K | | 25 | | 20 | | | 55 |
| L | | 30 | | 30 | | | 40 |
| U | 40 | | | | | 20 | 40 |
| S | | | 50 | | 5 | 5 | 40 |

TABLE 2

| | NYLON 12 1709p | NYLON 12/6/6, 6 T171 | NYLON 12 /ETHER E40S3 | XYLYLENE BIS STEARIC ACID AMIDE | ETHYLENE BIS LAURIC ACID AMIDE | ETHYLENE BIS STEARIC ACID AMIDE | N,N'-DIACETYL-PIPERAZINE |
|---|---|---|---|---|---|---|---|
| a | 23 | | | 5 | | 2 | 70 |
| b | 25 | | | 15 | | | 60 |
| c | 40 | | | | 20 | | 40 |
| d | | 23 | | 10 | | 2 | 60 |
| e | | 45 | | | | 15 | 40 |
| f | | | 25 | 5 | | 2 | 70 |
| g | | | 45 | | | 15 | 40 |

As the polyamide resin material in which the average number of carbon atoms present between amido groups in its chemical structure is controlled, nylon 12 ("A1709P" produced by Daicel-Huels Ltd., density: 1.01, melting point: 178° C., water absorbency: 0.9%) whose average carbon number is 11, nylon 6 whose average carbon number is 5, and nylon 6, 6 whose average carbon number is 5 were copolymerized. As a copolymer of nylon 12/6/6,6 whose average carbon number is 7.7, a commercial product, "T171" produced by Daicel-Huels Ltd. (density: 1.108, melting point: 150° C. water absorbency: 2.0%) was used, while "E40S3" produced by Daicel-Huels Ltd. (density: 1.01, melting point: 125° C., water absorbency: 0.3%) was used as a nylon 12/ether elastomeric copolymer whose average carbon number is 11 or more.

The selected nylon resin components (i.e., "A1709P", "T171" and "E40S3"), N, N'-xylylene bis stearic acid amide, N, N'-diacetylpiperazine, N, N'-ethylene bis stearic acid amide, and N, N'-ethylene bis lauric acid amide were melted and mixed at the weight ratios shown in Tables 1 and 2. The mixtures were cooled and pulverized, thereby obtaining Binders a to g.

For water-solvent extraction, Binders M, N, V, W, X, Y, m, v, x, y were prepared in the following way: The polyamide resin components (1)and (3), nylon 12 ("A1709P" produced by Daicel-Huels Ltd.), N, N'- ethylene bis lauric acid amide, and acetamide (or acetaminophenol or toluylenediamine in place of N, N'-diacetylpiperazine) were mixed at the weight ratios shown in Tables 3 and 4. Then, the mixtures were cooled and pulverized.

TABLE 3

| | POLYAMIDE RESIN COMPONENT (1) | XYLYLENE BIS STEARIC ACID AMIDE | ETHYLENE BIS STEARIC ACID AMIDE | TOLUYLENE-DIAMINE | ACETAMIDE | ACETAMINO-PHENOL |
|---|---|---|---|---|---|---|
| M | 25 | 3 | 2 | 70 | | |
| N | 40 | 20 | | 40 | | |
| V | 25 | 3 | 2 | | 70 | |
| W | 40 | 20 | | | 40 | |
| X | 25 | 3 | 2 | | | 70 |
| Y | 40 | 20 | | | | 40 |

TABLE 4

|   | NYLON 12 1709p | XYLYLENE BIS STEARIC ACID AMIDE | ETHYLENE BIS STEARIC ACID AMIDE | TOLUYLENE-DIAMINE | ACETAMIDE | ACETAMINO-PHENOL |
|---|---|---|---|---|---|---|
| m | 25 | 3 | 2 | 70 | | |
| v | 25 | 3 | 2 | | 70 | |
| w | 40 | 20 | | | 40 | |
| y | 40 | 20 | | | | 40 |

7 mols of $C_{36}$-dimeric acid ("PRIPOL 1013" produced by Unichema International, linear chain component: 23 mol %), 13 mols of azelaic acid, 13 mols of ethylenediamine and 7 mols of xylylenediamine were mixed and dehydro-copolycondensated, thereby obtaining a polyamide resin component (5) having an average molecular weight of about 40,000. With the polyamide resin component (5), Binders T1, T2 shown in Table 6 were prepared. The average carbon number of the polyamide resin component (5) is about 9.6.

For the purpose of comparison, the polyamide resin component (1), nylon 12 ("A1709P" produced by Daicel-Huels Ltd.), N, N'-xylylene bis stearic acid amide, N, N'-ethylene bis lauric acid amide and N, N'-diacetylpiperazine were melted and mixed at the weight ratios shown in Tables 5 and 7, thereby obtaining Binders O to R and o to r.

TABLE 5

|   | POLYAMIDE RESIN COMPONENT (1) | XYLYLENE BIS STEARIC ACID AMIDE | ETHYLENE BIS LAURIC ACID AMIDE | N,N'-DIACETYL-PIPERAZINE |
|---|---|---|---|---|
| O | 42 | 20 | | 38 |
| P | 23 | | 15 | 62 |
| Q | 40 | 10 | | 50 |
| R | 25 | 37 | | 38 |

TABLE 6

|   | POLYAMIDE RESIN COMPONENT (5) | XYLYLENE BIS STEARIC ACID AMIDE | ETHYLENE BIS LAURIC ACID AMIDE | N,N'-DIACETYL-PIPERAZINE |
|---|---|---|---|---|
| T1 | 35 | | 15 | 50 |
| T2 | 35 | 15 | | 50 |

TABLE 7

|   | NYLON 12 1709p | XYLYLENE BIS STEARIC ACID AMIDE | ETHYLENE BIS LAURIC ACID AMIDE | N,N'-DIACETYL-PIPERAZINE |
|---|---|---|---|---|
| o | 42 | 20 | | 38 |
| p | 23 | | 15 | 62 |
| q | 40 | 10 | | 50 |
| r | 25 | 37 | | 38 |

For comparison purpose, known Binders SS, TT, XX, YY and Binders ZZ, yy as shown in Table 8 were prepared. Binders ZZ and yy were improved over Binder YY in water absorbency according to the concept of the invention.

TABLE 8

|   | EVA RESIN | ACRYLIC RESIN | PARAFFIN WAX | DIBUTYL PHTHALATE | STEARIC ACID |
|---|---|---|---|---|---|
| SS | 35.2 wt % | 26.4 wt % | 26.4 wt % | 12.0 wt % | |
| TT | 28.3 wt % | 26.5 wt % | 23.0 wt % | 14.2 wt % | 8.0 wt % |

|   | POLYPROPYLENE | NATURAL WAX | PARAFFIN WAX |
|---|---|---|---|
| XX | 40.0 wt % | 30.0 wt % | 30.0 wt % |

|   | POLYAMIDE RESIN COMPONENT (4) | ETHYLENE BIS LAURIC ACID AMIDE | N,N'-DIACETYL-PIPERAZINE |
|---|---|---|---|
| YY | 45.0 wt % | 25.0 wt % | 30.0 wt % |

|   | POLYAMIDE RESIN COMPONENT (4) | ETHYLENE BIS STEARIC ACID AMIDE | N,N'-DIACETYL-PIPERAZINE |
|---|---|---|---|
| yy | 45.0 wt % | 25.0 wt % | 30.0 wt % |

|   | POLYAMIDE RESIN COMPONENT (3) | ETHYLENE BIS LAURIC ACID AMIDE | N,N'-DIACETYL-PIPERAZINE |
|---|---|---|---|
| ZZ | 40.0 wt % | 20.0 wt % | 40.0 wt % |

Binders YY and yy were prepared in such a way that: $C_{36}$-dimeric acid ("PRIPOL 1013" produced by Unichema International, linear chain component: about 25 mol %), azelaic acid, ethylenediamine and xylylenediamine were mixed at an equal molecular weight ratio and dehydrocopolycondensated, whereby a polyamide resin component (4) having an average molecular weight of about 40,000 was obtained; and the polyamide resin component (4) was melted and mixed with the components shown in Table 8 at the weight ratios shown in Table 8. The average carbon number of the polyamide resin component (4) is about 12.2.

For Binder ZZ, the polyamide resin component (3) having an average molecular weight of about 40,000 was used, the polyamide resin component (3) being prepared by mixing and dehydro-copolycondensating: (i) 10 mols of a dimer acid containing $C_{36}$-dimeric acid ("PRIPOL 1008" produced by Unichema International) and $C_{44}$-dimeric acid ("PRIPOL 1004") at a weight ratio of 7:3, (ii) 10 mols of azelaic acid, (iii) 10 mols of ethylenediamine and (iv) 10 mols of xylylenediamine. The average carbon number of the polyamide resin component (3) is 12.9 and the mole percentage of linear chain component in the chemical structure of the polyamide resin component (3) is approximately 50 mol % or more.

Figure 1:
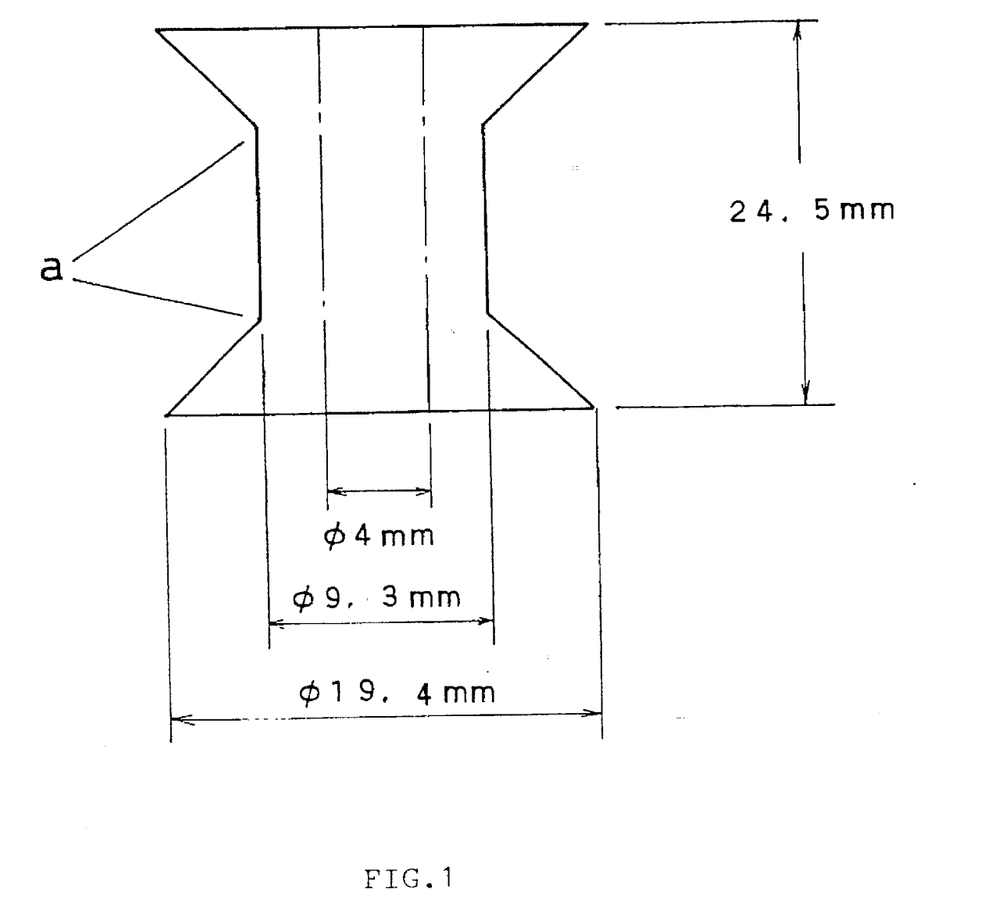
FIG. 1 is a side view of a molded article prepared by metal powder injection in the experiment.

(B) Sintering body production methods (I), (II) by thermal decomposition debinding (I) A spherical stainless steel fine powder material (SUS316L, mean particle diameter: 10 microns) produced by the gas atomizing method was mixed with the respective Binders A to L, O to R, SS to YY, a to g and o to r. The mixtures were respectively kneaded while being heated at a temperature of 140° C., followed by cooling and pulverization. Then, top-shaped molded bodies as shown in FIG. 1 were obtained by injection-molding the mixtures at a pressure of 660 kg/cm². Then, these molded bodies were debinded, by placing in the atmosphere in a hot air recirculating furnace (air flow rate: 1 to 1.5 m/sec) and by raising temperature over 24 hours from 20° C. to 320° C. After checking that the amount of residual binder components was not more than 8% of the amount of each binder before debinding, the molded bodies were vacuum-sintered over one hour at a temperature of 1,350° C.

The ratio of the amount of each added binder to the amount of spherical stainless steel fine powder material (the parts by weight of each binder per 100 parts by weight of the powder material); injection molding temperature; the quality of each molded body; the shape, density and carbon content of each sintered body are as shown in Table 9.

TABLE 9

| | PARTS BY WEIGHT OF BINDER PER 100 PARTS BY WEIGHT OF METAL POWDER | INJECTION MOLDING TEMPERATURE (°C.) | QUALITY OF MOLDED BODY (100 SAMPLES) | | QUALITY OF SINTERED BODY (50 SAMPLES) | | | DENSITY OF SINTERED BODY (g/cm³) | CARBON CONTENT OF SINTERED BODY (%) |
|---|---|---|---|---|---|---|---|---|---|
| | | | FAIR | CRACKED/CHIPPED | FAIR | DEFORMED | MELTED | | |
| A–L | 6.0 | 140 | 100 | 0 | 50 | 0 | 0 | 7.70 | 0.001 |
| O | 6.0 | 140 | 100 | 0 | 48 | 2 | 0 | 7.70 | 0.002 |
| P | 6.0 | 140 | 100 | 0 | 47 | 3 | 0 | 7.71 | 0.001 |
| Q | 6.0 | 140 | 98 | 2 | 50 | 0 | 0 | 7.72 | 0.001 |
| R | 6.0 | 140 | 98 | 2 | 49 | 1 | 0 | 7.73 | 0.001 |
| SS | 6.5 | 140 | 100 | 0 | 0 | 50 | 0 | 7.20 | 0.056 |
| TT | 6.0 | 130 | 100 | 0 | 0 | 50 | 0 | 7.29 | 0.016 |
| XX | 6.0 | 140 | 74 | 26 | 0 | 0 | 50 | x | x |
| YY | 6.0 | 140 | 100 | 0 | 0 | 25 | 25 | 7.70 | 0.012 |
| a–c | 6.0 | 140 | 100 | 0 | 50 | 0 | 0 | 7.71 | 0.001 |
| e–g | 6.0 | 140 | 100 | 0 | 50 | 0 | 0 | 7.72 | 0.001 |
| d | 6.0 | 140 | x | x | x | x | x | x | x |

Note that mark x indicates that a sintered body good enough for measurement was not obtained. To prevent deformation, molded bodies prepared using Binders SS to YY of the comparative examples are usually required to be embedded in a support powder such as alumina powder at the time of debinding. However, such a support powder was not used and all the molded bodies were tested under the same conditions in order to make a distinction between Binders A to L of the invention and the binders of the comparative examples.

Figure 2:
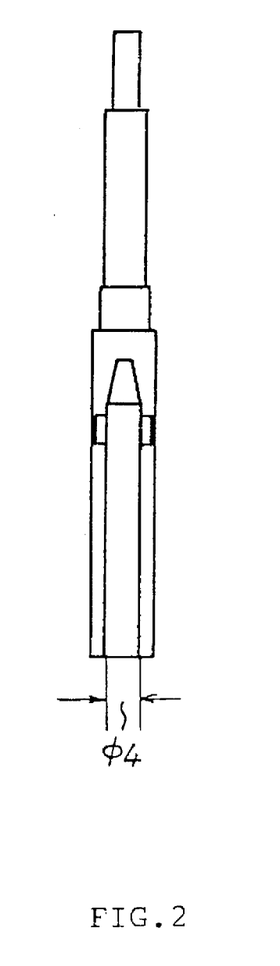
FIG. 2 is a side view of a sample prepared in the experiment.

(II) A carbonyl iron powder material ("CS iron fine powder" produced by BASF Japan Ltd., mean particle diameter: 5 microns) was mixed with the Binders C, D, F, I, U, YY, c, e, g, respectively. The mixtures were respectively kneaded while being heated at a temperature of 140° C., followed by cooling and pulverization. Then, molded bodies as shown in FIG. 2 were obtained by injection-molding the mixtures at a pressure of 660 kg/cm². Then, these molded bodies were debinded, by placing in an atmosphere of $N_2$ gas in a hot air recirculating furnace (air flow rate: 1.0 m/sec) and by raising temperature over 50 to 65 hours from room temperature to 350° to 450° C. (final temperature). Thereafter, the molded bodies were vacuum-sintered over one hour at a temperature of 1,200° C. It took many hours to perform the debinding step to prevent deformation of the molded bodies as much as possible and to grasp the condition of defects that might have occurred within the molded bodies.

Table 10 shows the ratio of the amount of each added binder to the amount of spherical carbonyl iron fine powder material (the parts by weight of each binder per 100 parts by weight of the powder material); injection molding temperature; final debinding temperature; the quality (the presence of defects), shape, density and carbon content of each sample.

TABLE 10

| PARTS BY WEIGHT OF BINDER PER 100 PARTS BY WEIGHT OF METAL POWDER | INJECTION MOLDING TEMPERATURE (°C.) | QUALITY OF DEBINDED BODY (100 SAMPLES) | | | FINAL DEBINDING TEMPERATURE (°C.) | SHAPE OF SINTERED BODY (20 SAMPLES) | | | DENSITY OF SINTERED BODY (g/cm³) | CARBON CONTENT OF SINTERED BODY (%) |
|---|---|---|---|---|---|---|---|---|---|---|
| | | FAIR | INTERNAL CRACKING (X-RAY) | CHIPPING OF HOLE AREA, CRACKING | | FAIR | DEFORMED | MELTED | | |
| C | 9.0 | 140 | 100 | 0 | 0 | 350 | 20 | 0 | 0 | 7.72 | 0.62 |
| | | | | | | 400 | 20 | 0 | 0 | 7.70 | 0.67 |
| | | | | | | 450 | 20 | 0 | 0 | 7.70 | 0.72 |
| D | 9.0 | 140 | 100 | 0 | 0 | 350 | 20 | 0 | 0 | 7.71 | 0.65 |
| | | | | | | 400 | 20 | 0 | 0 | 7.71 | 0.72 |
| | | | | | | 450 | 20 | 0 | 0 | 7.72 | 0.84 |
| F | 9.0 | 140 | 82 | 13 | 5 | 350 | 20 | 0 | 0 | 7.71 | 0.73 |
| | | | | | | 400 | 20 | 0 | 0 | 7.71 | 0.95 |
| | | | | | | 450 | 18 | 0 | 2 | 7.52 | 1.70 |
| I | 9.0 | 140 | 100 | 0 | 0 | 350 | 20 | 0 | 0 | 7.70 | 0.75 |
| | | | | | | 400 | 20 | 0 | 0 | 7.73 | 0.80 |
| | | | | | | 450 | 20 | 0 | 0 | 7.72 | 0.82 |
| YY | 9.0 | 140 | 76 | 17 | 7 | 350 | 20 | 0 | 0 | 7.71 | 0.80 |
| | | | | | | 400 | 20 | 0 | 0 | 7.78 | 1.12 |
| | | | | | | 450 | 10 | 0 | 10 | 7.32 | 1.95 |
| U | 9.0 | 140 | 81 | 0 | 19 | 350 | 20 | 0 | 0 | 7.72 | 0.65 |
| | | | | | | 400 | 20 | 0 | 0 | 7.73 | 0.70 |
| | | | | | | 450 | 20 | 0 | 0 | 7.72 | 0.70 |
| c | 9.0 | 140 | 87 | 10 | 3 | 350 | 20 | 0 | 0 | 7.71 | 0.74 |
| | | | | | | 400 | 20 | 0 | 0 | 7.72 | 1.06 |
| | | | | | | 450 | 11 | 0 | 9 | 7.41 | 1.86 |
| e | 9.0 | 140 | 100 | 0 | 0 | 350 | 20 | 0 | 0 | 7.71 | 0.70 |
| | | | | | | 400 | 20 | 0 | 0 | 7.72 | 0.71 |
| | | | | | | 450 | 20 | 0 | 0 | 7.71 | 0.73 |
| g | 9.0 | 140 | 100 | 0 | 0 | 350 | 20 | 0 | 0 | 7.72 | 0.67 |
| | | | | | | 400 | 20 | 0 | 0 | 7.71 | 0.71 |
| | | | | | | 450 | 20 | 0 | 0 | 7.73 | 0.70 |

Figure 3:
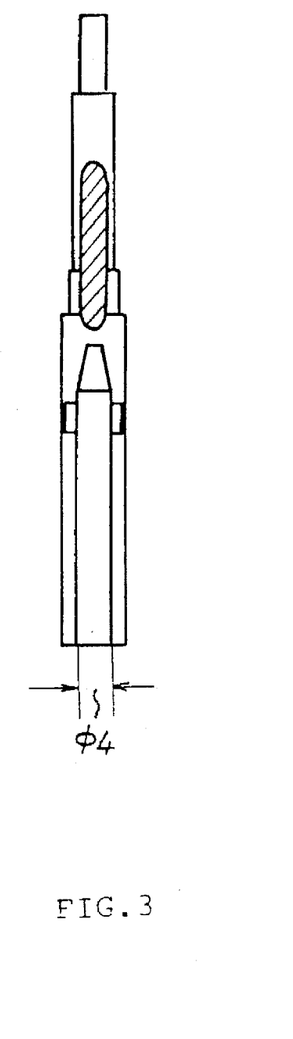
FIG. 3 is a side view showing an internal crack in the sample of FIG. 2.

The presence of cracks in debinded bodies was checked by X-ray inspection and Table 10 shows the probability of the occurrence of cracks in percentage. An internal crack in the debinded bodies obtained from Binders F, YY, c is shown in FIG. 3. The incidence of internal cracks can be significantly reduced by subjecting the molded bodies to annealing treatment (110° C. ×4H) in an atmosphere of $N_2$ gas. From this fact, it is to be understood that although the cause of internal cracks cannot be ascertained, such internal cracks are presumably caused by a residual stress which is generated during injection molding by the use of a brittle, wax-like binder having a high coagulation/shrinkage factor. However, it is very difficult to perfectly prevent the occurrence of internal cracks.

(D) A sintered body production method by water-solvent extraction debinding

Figure 4:
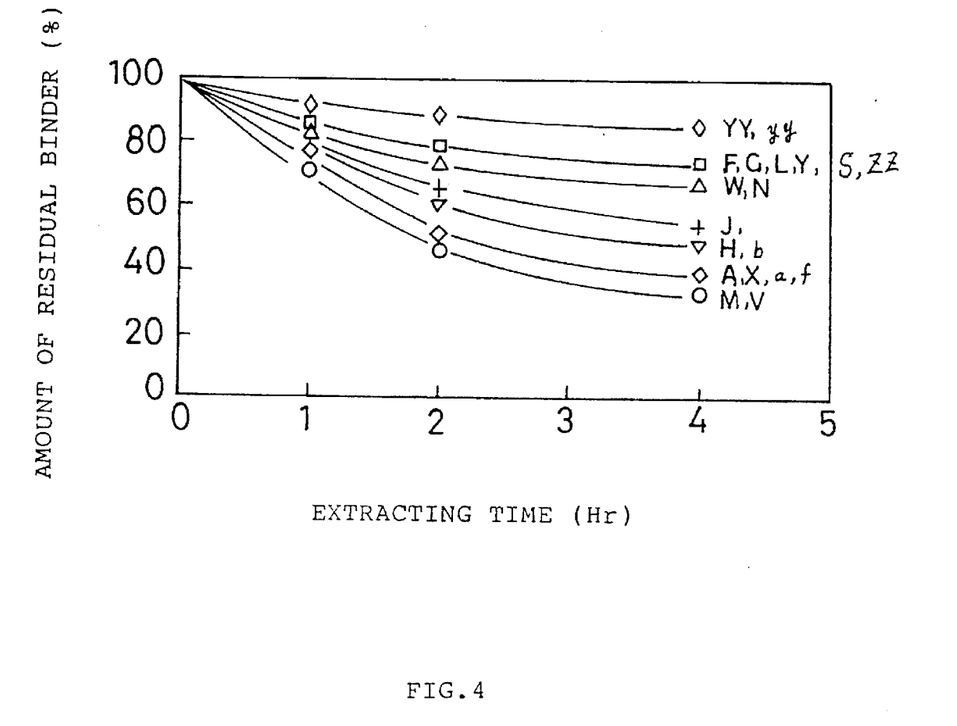
FIG. 4 is a graph of the amount of residual binder components verses extraction time for a molded body, the molded body being subjected to an extraction process in which the binder is extracted therefrom by the use of an aqueous solution and then to a drying process.

A spherical stainless steel fine powder material (SUS316L, mean particle diameter: 10 microns) produced by the gas atomizing method was mixed with the respective Binders A, F, G, H, J, L, S, M, N, V, W, X, Y, YY, yy, ZZ, $T_1$, $T_2$, a to c, e to g, m, v, w and y. The mixtures were respectively kneaded while being heated at a temperature of 140° C., followed by cooling and pulverization. Then, the top-shaped molded bodies as shown in FIG. 1 were obtained by injection-molding the mixtures at a pressure of 660 kg/cm². After these molded bodies had been immersed into water having a temperature of 25° C. for 1 hour, 2 hours and 4 hours respectively, they were dried at 100° C. for 1 hour. The molded bodies were weighed after drying to obtain the amount of residual binder components in each body. FIG. 4 shows the representative measurement results.

Then, the molded bodies which had been debinded by water-solvent extraction for 1 hour, 2 hours and 4 hours respectively were further debinded, by placing in the atmosphere in a hot air recirculating furnace (air flow rate: 1 to 1.5 m/sec) and by raising temperature over 6 hours from 20° C. to 320° C. After checking that the amount of residual binder components was not more than 8% of the amount of each binder before debinding, the samples were vacuum-sintered over one hour at a temperature of 1,350° C. It should be noted that there was no problem in further debinding the samples subsequently to the drying treatment at 100° C.

Table 11 shows the ratio of the amount of each added binder to the amount of spherical stainless steel fine powder material (the parts by weight of each binder per 100 parts by weight of the powder material) for each of the sintered bodies obtained by water-solvent extraction for 1 hour, 2 hours and 4 hours; injection molding temperature; the quality, shape, density and carbon content of each sample. As to the quality of the molded bodies, no cracks were found in 100 samples.

TABLE 11

| | PARTS BY WEIGHT OF BINDER PER 100 PARTS BY WEIGHT OF METAL POWDER | INJECTION MOLDING TEMPER- ATURE (°C.) | SHAPE OF SINTERED BODY AFTER 1-HOUR WATER SOLVENT EXTRACTION (50 SAMPLES) | | | SHAPE OF SINTERED BODY AFTER 2-HOURS WATER SOLVENT EXTRACTION (50 SAMPLES) | | SHAPE OF SINTERED BODY AFTER 4-HOURS WATER SOLVENT EXTRACTION (50 SAMPLES) | | DEN- SITY OF SIN- TERED BODY (g/cm$^3$) | CARBON CON- TENT OF SIN- TERED BODY (%) |
|---|---|---|---|---|---|---|---|---|---|---|---|
| | | | FAIR | DE- FORMED | MELT- ED | FAIR | DE- FORMED | FAIR | DE- FORMED | | |
| A | 6.0 | 140 | 30 | 20 | 0 | 50 | 0 | 50 | 0 | 7.69 | 0.001 |
| F | 6.0 | 140 | 0 | 50 | 0 | 35 | 15 | 50 | 0 | 7.71 | 0.001 |
| G | 6.0 | 140 | 0 | 50 | 0 | 33 | 17 | 50 | 0 | 7.70 | 0.001 |
| H | 6.0 | 140 | 18 | 32 | 0 | 49 | 1 | 50 | 0 | 7.70 | 0.001 |
| J | 6.0 | 140 | 19 | 31 | 0 | 46 | 4 | 50 | 0 | 7.72 | 0.001 |
| L | 6.0 | 140 | 0 | 50 | 0 | 30 | 20 | 50 | 0 | 7.71 | 0.001 |
| M | 6.0 | 140 | 30 | 20 | 0 | 50 | 0 | 50 | 0 | 7.70 | 0.001 |
| N | 6.0 | 140 | 0 | 50 | 0 | 43 | 7 | 50 | 0 | 7.73 | 0.001 |
| V | 6.0 | 140 | 34 | 16 | 0 | 50 | 0 | 50 | 0 | 7.71 | 0.001 |
| W | 6.0 | 140 | 0 | 50 | 0 | 42 | 8 | 50 | 0 | 7.71 | 0.001 |
| X | 6.0 | 140 | 13 | 37 | 0 | 50 | 0 | 50 | 0 | 7.70 | 0.001 |
| Y | 6.0 | 140 | 0 | 50 | 0 | 21 | 29 | 50 | 0 | 7.72 | 0.001 |
| YY | 6.0 | 130 | 0 | 27 | 23 | 0 | 50 | 20 | 30 | 7.35 | 0.002 |
| yy | 6.0 | 130 | 0 | 35 | 15 | 0 | 50 | 17 | 33 | 7.61 | 0.001 |
| ZZ | 6.0 | 130 | 0 | 50 | 0 | 34 | 16 | 50 | 0 | 7.72 | 0.001 |
| S | 6.0 | 140 | 0 | 50 | 0 | 35 | 15 | 50 | 0 | 7.71 | 0.001 |

TABLE 12

| | PARTS BY WEIGHT OF BINDER PER 100 PARTS BY WEIGHT OF METAL POWDER | INJECTION MOLDING TEMPER- ATURE (°C.) | SHAPE OF SINTERED BODY AFTER 1-HOUR WATER SOLVENT EXTRACTION (50 SAMPLES) | | | SHAPE OF SINTERED BODY AFTER 2-HOURS WATER SOLVENT EXTRACTION (50 SAMPLES) | | SHAPE OF SINTERED BODY AFTER 4-HOURS WATER SOLVENT EXTRACTION (50 SAMPLES) | | DEN- SITY OF SIN- TERED BODY (g/cm$^3$) | CARBON CON- TENT OF SIN- TERED BODY (%) |
|---|---|---|---|---|---|---|---|---|---|---|---|
| | | | FAIR | DE- FORMED | MELT- ED | FAIR | DE- FORMED | FAIR | DE- FORMED | | |
| a | 6.0 | 140 | 31 | 19 | 0 | 50 | 0 | 50 | 0 | 7.68 | 0.002 |
| b | 6.0 | 140 | 17 | 33 | 0 | 48 | 2 | 50 | 0 | 7.70 | 0.002 |
| c | 6.0 | 140 | 0 | 50 | 0 | 37 | 13 | 50 | 0 | 7.71 | 0.001 |
| e | 6.0 | 140 | 0 | 50 | 0 | 33 | 17 | 50 | 0 | 7.71 | 0.001 |
| f | 6.0 | 140 | 32 | 18 | 0 | 50 | 0 | 50 | 0 | 7.70 | 0.002 |
| g | 6.0 | 140 | 0 | 50 | 0 | 36 | 14 | 50 | 0 | 7.72 | 0.010 |
| m | 6.0 | 140 | 34 | 16 | 0 | 50 | 0 | 50 | 0 | 7.70 | 0.001 |
| v | 6.0 | 140 | 36 | 14 | 0 | 50 | 0 | 50 | 0 | 7.71 | 0.001 |
| w | 6.0 | 140 | 0 | 50 | 0 | 37 | 13 | 50 | 0 | 7.72 | 0.001 |
| y | 6.0 | 140 | 0 | 50 | 0 | 33 | 17 | 50 | 0 | 7.71 | 0.001 |

(D) Test results

① Samples subjected to only thermal decomposition debinding Some molded bodies prepared using Binder F and having particular crystal forms are liable to breakage or chipping within the molds after molding and liable to internal defects occurring during the debinding step, because Binder F contains a large amount of ethylene bis lauric acid amide compared to other binders among Binders A to L and this imparts hard, brittle wax-like characteristics to Binder F. It has been found that when Binder F is used, the carbon content of the sintered body should be fully controlled. Binders G, I, J impart excellent toughness to their molded articles. As to shape retention during the debinding step and sintering density etc., Binders A to L had substantially the same effects and achieved good results. Binders J, K, L containing no lubricant did not present any problems in the mold-release characteristics of the molded bodies when removed from the molds.

Of Binders a to g, the molded bodies prepared using Binder c changed in quality and become wax-like so that they suffer from the substantially same problems as those of the molded bodies prepared using Binder F. In the molded bodies prepared using Binder d, xylylene bis stearic acid has not enough compatibility, causing the separation of liquid phase components during molding. This considerably harmed moldings characteristics so that a molded body good enough for subsequent debinding and sintering tests was not obtained. Apart from Binder d, there was no distinctive difference among other binders, in terms of shape retention during the debinding step and sintering density. Regarding the mold-release characteristics of molded bodies, binders other than Binder d did not present any problems.

In the molded bodies prepared using Binders O and R, a little blistering and deformation occurred in the debinding step. The molded bodies using Binder P were deformed in the debinding step, while the molded bodies using Binder Q had poor mold-release characteristics so that they were difficult to be removed from the molds. The molded bodies using Binder R were easily cracked at their edges when removed from the molds.

Binders o, p, q, r have the substantially same features as Binders O, P, Q, R, respectively, except that Binder q is improved over Binder Q in mold-release characteristics. The reason for the improvement is that Binder q contains nylon 12 having a high degree of crystallinity while Binder Q contains a polyamide resin component made from $C_{44}$-dimeric acid, so that the former is improved in adhesiveness.

Of the molded bodies prepared from the carbonyl iron fine powder material using Binders C, D, F, I, U, YY, c, e, g, and debinded in an atmosphere of $N_2$ gas, the molded bodies using Binders F and YY exhibit a high incidence of internal cracks and chips. The carbon content of the sintered bodies prepared using Binders F and YY varied according to their final debinding temperatures. On the other hand, Binder U was not only free from the occurrence of internal cracks and troubles in the carbon content of sintered bodies, but also proved to be superior to Binder F as a lubricant.

② Samples subjected to water-solvent extraction debinding Binders YY and $T_1$ both contain $C_{36}$-dimeric acid, and the polyamide resin components of Binders YY and $T_1$ have an average carbon number of 12.2 and 9.6 respectively. Therefore, they were expanded during extraction by a water solvent. Moisture entrapped in the molecules of $C_{36}$-dimeric acid rapidly gasified during subsequent thermal decomposition debinding, causing blisters and cracks. This defect was remarkable especially in the molded bodies prepared using Binder $T_1$. Blistering and cracking were almost prevented in the case of Binder ZZ which contains the polyamide resin component in which a mixture of $C_{36}$-dimeric acid and $C_{44}$-dimeric acid is contained in such an amount that the linear chain component of the dimer acid accounts for 50 mol % or more and therefore the average carbon number is 12.9. Remarkable blisters and cracks were not found in the molded bodies prepared with Binder yy, thanks to ethylene bis stearic acid amide added as a lubricant. Water-solvent extraction debinding could be performed on Binders YY and yy which have an average carbon number of 12.2 and could not be performed on Binder $T_1$ whose average carbon number was 9.6. It is to be understood from this fact that a polyamide resin component whose average carbon number is 10 or more is desirable for water-solvent extraction debinding.

The molded bodies prepared with Binders A, F, G, H, J, M, N, V, W, X, Y were not deformed during the sequential thermal decomposition debinding process and defects such as blisters, cracks or internal cracks were found in them, even in the case of those subjected to 4-hour water-solvent extraction.

Of Binders a to c, e to g, m, v, w, y, blisters and cracks were found in the case of Binders c and e, like the case of Binder YY. The reason for this is that Binders c and e contain the polyamide resin component having high water absorbency and large amounts of ethylene bis lauric acid amide which is thermally unstable so that moisture absorbed in the molded bodies rapidly gasifies. When xylylene bis stearic acid amide is present in a binder, the water absorbency of the polyamide resin component remarkably decreases so that the water-solvent extraction debinding method can be easily applied to molded bodies prepared by such a binder. Unless xylylene bis stearic acid amide is added, the polyamide resin component should be satisfactorily resistant to water. It is understood from the above results that the average carbon number of the polyamide resin component should be at least 10. In this respect, it is preferred to use a polyamide resin material containing $C_{44}$-dimeric acid and $C_{36}$-dimeric acid as a main component and pretty large amounts of xylylenediamine and hexamethylenediamine. Another preferred polyamide resin material is prepared by copolymerization of nylon 12 and ether.

The sintered body production method utilizing only thermal decomposition debinding was applied to Binders A to L, YY, ZZ, $T_1$, $T_2$, a to c, and e to g. The same powder material was mixed with these binders respectively and each mixture was kneaded while being heated at a temperature of 140° C. After cooling and pulverization, each pulverized material was placed in a stainless vessel and this vessel was left without a lid for a period of two days in a room where temperature was about 25° C. and humidity was 80% or more, in order to check the influence of moisture absorbed from air. These pulverized materials which had been left for two days were respectively injection-molded into a top-shaped body as shown in FIG. 1 under the same conditions.

The molded bodies using Binders A to L, ZZ, $T_2$, a, b, f, g had no problem. On the other hand, the molded bodies using Binders YY, $T_1$, c had cracks at the area a (see FIG. 1) and the parting line areas when removed from the molds, because of extreme strength deterioration caused by water absorption, with the result that the molded bodies removed from the molds were broken into several pieces and no satisfactory molded bodies could be obtained.

In the foregoing experiment, N, N'- diacetylpiperazine (secondary amine) and toluylenediamine (primary amine) were used as the water-soluble amine material, and acetamide (no benzene ring-containing group) and acetaminophenol (benzene ring-containing group) were used as the water-soluble amide material. "PRIPOL 1004" produced by Unichema International was used as the $C_{44}$-dimeric acid and "PRIPOL 1008", "PRIPOL 1013" produced by Unichema International were used as the $C_{36}$-dimeric acid. Azelaic acid was used as the aliphatic dicarboxylic acid, and ethylenediamine and xylylenediamine were used as the diamine. N, N'-xylylene his stearic acid amide ("Slipacks PXS" produced by Nippon Kasei Chemical Co., Ltd.) was used as the aromatic bisamide serving as a compatibilizer and N, N'-ethylene his lauric acid amide ("Slipacks L" produced by Nippon Kasei Chemical Co., Ltd.) and N, N'-ethylene his stearic acid amide ("Slipacks E" produced by Nippon Kasei Chemical Co., Ltd.) were used as the lubricant. The same effects can be achieved even if these materials are replaced by their alternatives listed earlier.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A binder for use in metal powder injection molding comprising:
   (a) 40 to 70 wt % of a water-soluble amide material and/or water-soluble amine material; and
   (b) 25 to 60 wt % of a polyamide resin component containing (i) a polyamide resin material having 8 carbon atoms or more on average between amido groups and (ii) an aromatic bisamide serving as a compatibilizer and having 8 carbon atoms or more on average between amido groups, the amount of the aromatic bisamide mixed with the polyamide resin material being up to an amount substantially equal to the amount of the polyamide resin material.

2. The binder for use in metal powder injection molding as claimed in claim 1, wherein the polyamide resin material is prepared by co-polycondensation of (1) a $C_{36}$-dimeric acid, $C_{44}$-dimeric acid or a mixture of the $C_{36}$-dimeric acid and $C_{44}$-dimeric acid; (2) an aliphatic dicarboxylic acid having 6 to 10 carbon atoms; (3) xylylenediamine; and (4) ethylenediamine and/or hexamethylenediamine.

3. The binder for use in metal powder injection molding as claimed in claim 2, wherein the average molecular weight of the polyamide resin material is 20,000 or more.

4. The binder for use in metal powder injection molding as claimed in claim 1, wherein the polyamide resin component comprises: (i) a polyamide resin material having 8 carbon atoms on average between amido groups and containing nylon 11 and nylon 12 as a major material and (ii) the aromatic bisamide serving as a compatibilizer and having 8 carbon atoms or more on average between amido groups, the amount of the aromatic bisamide mixed with the polyamide resin material being up to an amount substantially equal to the amount of the polyamide resin material.

5. The binder for use in metal powder injection molding as claimed in claim 4, wherein the average molecular weight of the polyamide resin material is 13,000 or more.

6. The binder for use in metal powder injection molding as claimed in any one of claim 1 to 5, wherein the aromatic bisamide is one member or a mixture of two or more members selected from the group consisting of xylylene bis stearic acid amide, N, N'-distearyl isophthalic acid amide and N, N'-distearyl terephthalic acid amide.

7. The binder for use in metal powder injection molding as claimed in any one of claims 1 to 5, wherein the water-soluble amide material has amido groups and the water-soluble amine material has amino groups and said water-soluble amide material and water-soluble amine material are one member or a mixture of two or more members selected from the group consisting of amide materials and amine materials which have a melting point of 190° C. or less and a boiling point of 175° C. or more.

8. The binder for use in metal powder injection molding as claimed in any one of claims 1 to 5, further comprising 0 to 15 wt % of a lubricant.

9. The binder for use in metal powder injection molding as claimed in claim 8, wherein the lubricant contains an aliphatic acid amide as a major component.

10. The binder for use in metal powder injection molding as claimed in claim 2 or 3, wherein the $C_{36}$-dimeric acid and $C_{44}$-dimeric acid are a polymerized fatty acid obtained by bimolecular polymerization of unsaturated fatty acids.

11. The binder for use in metal powder injection molding as claimed in claim 4 or 5, wherein the polyamide resin component has a melting point of about 190° C. or less or a glass-transition temperature of about 190° C. or less.

12. A binder for use in metal powder injection molding comprising:
(a) 40 to 70 wt % of a water-soluble amide material and/or water-soluble amine material; and
(b) 25 to 60 wt % of a polyamide resin component substantially composed of a polyamide resin material having 10 carbon atoms or more on average between amido groups.

13. The binder for use in metal powder injection molding as claimed in claim 12, wherein the polyamide resin material is prepared by co-polycondensation of (1) a $C_{36}$-dimeric acid, $C_{44}$-dimeric acid or a mixture of the $C_{36}$-dimeric acid and $C_{44}$-dimeric acid; (2) an aliphatic dicarboxylic acid having 6 to 10 carbon atoms; (3) xylylenediamine; and (4) ethylenediamine and/or hexamethylenediamine.

14. The binder for use in metal powder injection molding as claimed in claim 13, wherein the average molecular weight of the polyamide resin material is 20,000 or more.

15. The binder for use in metal powder injection molding as claimed in claim 12, wherein the polyamide resin component is substantially composed of a polyamide resin material having 10 carbon atoms or more on average between amido groups and containing nylon 11 and nylon 12 as a major component.

16. The binder for use in metal powder injection molding as claimed in claim 15, wherein the average molecular weight of the polyamide resin material is 13,000 or more.

17. The binder for use in metal powder injection molding as claimed in any one of claims 12 to 16, wherein the water-soluble amide material has amido groups and the water-soluble amine material has amino groups and said water-soluble amide material and water-soluble amine material are one member or a mixture of two or more members selected from the group consisting of amide materials and amine materials which have a melting point of 190° C. or less and a boiling point of 175° C. or more.

18. The binder for use in metal powder injection molding as claimed in claims 12 to 16, further comprising 0 to 15 wt % of a lubricant.

19. The binder for use in metal powder injection molding as claimed in claim 18, wherein the lubricant contains an aliphatic acid amide as a major component.

20. The binder for use in metal powder injection molding as claimed in claim 13 or 14, wherein the $C_{36}$-dimeric acid and $C_{44}$-dimeric acid are a polymerized fatty acid obtained by bimolecular polymerization of unsaturated fatty acids.

21. The binder for use in metal powder injection molding as claimed in claim 15 or 16, wherein the polyamide resin component has a melting point of about 190° C. or less or a glass-transition temperature of about 190° C. or less.

22. A binder for use in metal powder injection molding comprising:
(a) 40 to 70 wt % of a water-soluble amide material and/or water-soluble amine material; and
(b) 25 to 60 wt % of a polyamide resin component containing a polyamide resin material having 10 carbon atoms or more on average between amido groups, the polyamide resin material is prepared by co-polycondensation of (1) a $C_{36}$-dimeric acid having a linear chain system, $C_{44}$-dimeric acid or a mixture of a $C_{36}$-dimeric acid and a $C_{44}$-dimeric acid; (2) an aliphatic dicarboxylic acid having 6 to 10 carbon atoms; (3) xylylenediamine; and (4) ethylenediamine and/or hexamethylenediamine.

23. The binder for use in metal powder injection molding as claimed in claim 22, wherein the average molecular weight of the polyamide resin material is 20,000 or more.

24. The binder for use in metal powder injection molding as claimed in claims 22 or 23, wherein the water-soluble amide material has amido groups and the water-soluble amine material has amino groups and said water-soluble amide material and water-soluble amine material are one member or a mixture of two or more members selected from the group consisting of amide materials and amine materials which have a melting point of 190° C. or less and a boiling point of 175° C. or more.

25. The binder for use in metal powder injection molding as claimed in claims 22 or 23, further comprising 0 to 15 wt % of a lubricant.

26. The binder for use in metal powder injection molding as claimed in claim 25, wherein the lubricant contains an aliphatic acid amide as a major component.

27. The binder for use in metal powder injection molding as claimed in claim 22 or 23, wherein the $C_{36}$-dimeric acid and $C_{44}$-dimeric acid are a polymerized fatty acid obtained by bimolecular polymerization of unsaturated fatty acids.

28. A binder for use in metal powder injection molding comprising:

(a) 40 to 70 wt % of a water-soluble amide material and/or water-soluble amine material;

(b) 25 to 60 wt % of a polyamide resin component containing (i) a polyamide resin material having 10 carbon atoms or more on average between amido groups; and (c) up to 15 wt % of a lubricant.

29. The binder for use in metal powder injection molding as claimed in claim 28, wherein the polyamide resin material is prepared by co-polycondensation of (1) a $C_{36}$-dimeric acid, a $C_{44}$-dimeric acid or a mixture of a $C_{36}$-dimeric acid and a $C_{44}$-dimeric acid; (2) an aliphatic dicarboxylic acid having 6 to 10 carbon atoms; (3) xylylenediamine; and (4) ethylenediamine and/or hexamethylenediamine.

30. The binder for use in metal powder injection molding as claimed in claim 29, wherein the average molecular weight of the polyamide resin material is 20,000 or more.

31. The binder for use in metal powder injection molding as claimed in claim 28, wherein the polyamide resin component is substantially composed of a polyamide resin material having 10 carbon atoms or more on average between amido groups and containing nylon 11 and nylon 12 as a major component.

32. The binder for use in metal powder injection molding as claimed in claim 31, wherein the average molecular weight of the polyamide resin material 13,000 or more.

33. The binder for use in metal powder injection molding as claimed in any one of claims 28 to 32, wherein the water-soluble amide material has amido groups and the water-soluble amine material has amino groups and said water-soluble amide material and water-soluble amine material are one member or a mixture of two or more members selected from the group consisting of amide materials and amine materials which have a melting point of 190° C. or less and a boiling point of 175° C. or more.

34. The binder for use in metal powder injection molding as claimed in claim 28, wherein the lubricant contains an aliphatic acid amide as a major component.

35. The binder for use in metal powder injection molding as claimed in claim 29 or 30, wherein the $C_{36}$-dimeric acid and $C_{44}$-dimeric acid are a polymerized fatty acid obtained by bimolecular polymerization of unsaturated fatty acids.

36. The binder for use in metal powder injection molding as claimed in claim 31 or 32, wherein the polyamide resin component has a melting point of about 190° C. or less or a glass-transition temperature of about 190° C. or less.

* * * * *